United States Patent
Platus

[15] 3,647,028
[45] Mar. 7, 1972

[54] ENERGY ABSORBING ARRANGEMENT

[72] Inventor: David L. Platus, 2001 Holmby Avenue, Los Angeles, Calif. 90025

[22] Filed: Aug. 9, 1968

[21] Appl. No.: 751,606

[52] U.S. Cl. .................................................. 188/1, 74/492
[51] Int. Cl. ..................................... F16d 63/00, B62d 1/16
[58] Field of Search .................... 188/1 C; 74/492; 293/5 LF, 293/70

[56] References Cited

UNITED STATES PATENTS 3,435,919    4/1969    Gularte et al. ......................... 188/1 C

*Primary Examiner*—Duane A. Reger
*Attorney*—Herzig & Walsh

[57] ABSTRACT

There is disclosed herein an energy-absorbing arrangement in which a plurality of outer thin-walled, cylindrical, tubelike, annular, ductile metal members are confined in a space between two body members. Each of the plurality of outer thin-walled energy-absorbing members has at least one additional, similar, inner thin-walled energy-absorbing member concentrically mounted within it in a nested relationship. The body members are adapted to have relative motion therebetween in a preselected direction. The spacing between the two body members is less than the unstressed diametral dimension of the outermost of the energy absorbing members, and therefore all of the energy-absorbing members are diametrally deformed under force by the two body members and relative motion of one body member with respect to the other in a preselected direction rolls the energy-absorbing members and thereby absorbs energy due to the cyclical plastic deformation or hysteretic deformation thereof. A nondeformable rigid retainer means may be positioned within the innermost of the energy-absorbing members to limit the diametral deformation thereof to prevent stress relieving plastic flow or creep of the energy-absorbing members.

23 Claims, 16 Drawing Figures

INVENTOR
DAVID L. PLATUS
BY
Don Finkelstein
ATTORNEY

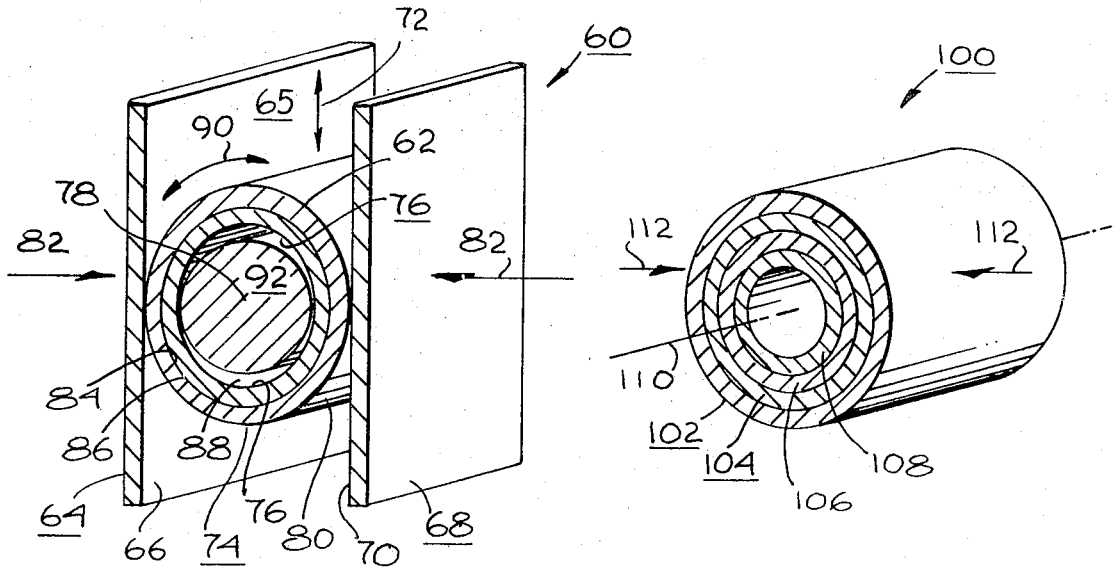
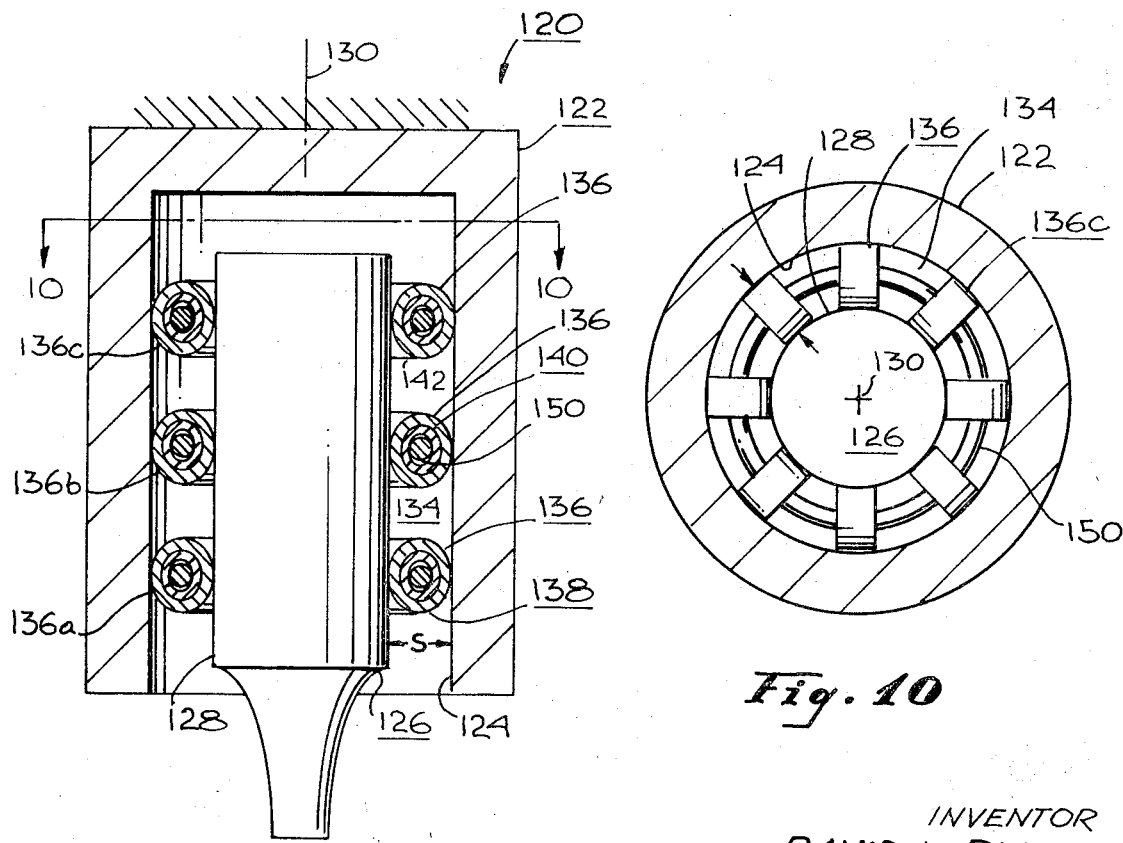

PATENTED MAR 7 1972
3,647,028
SHEET 3 OF 3
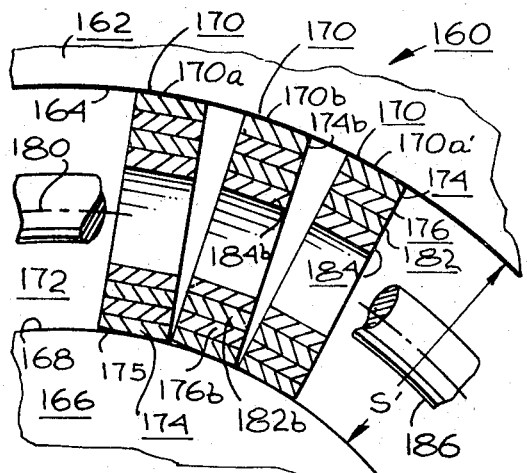
Fig. 11
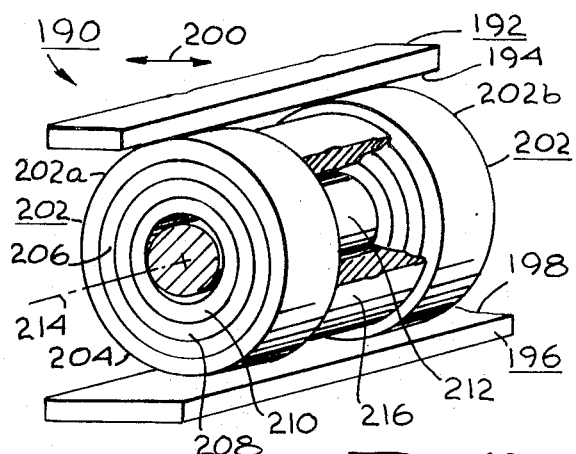
Fig. 12
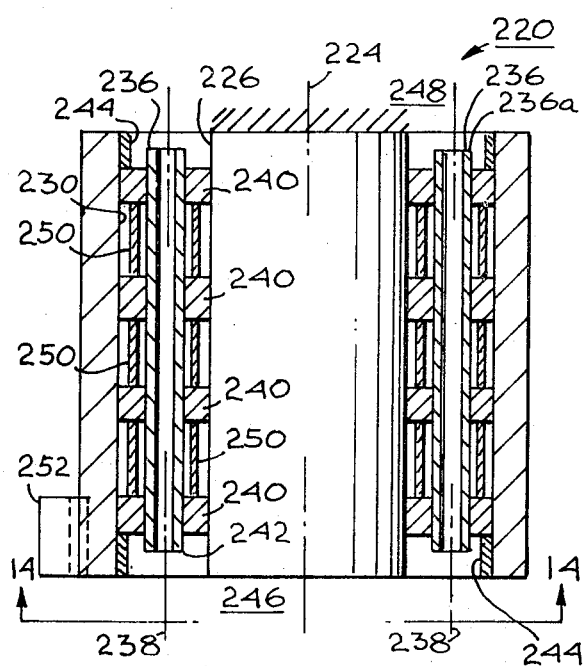
Fig. 13
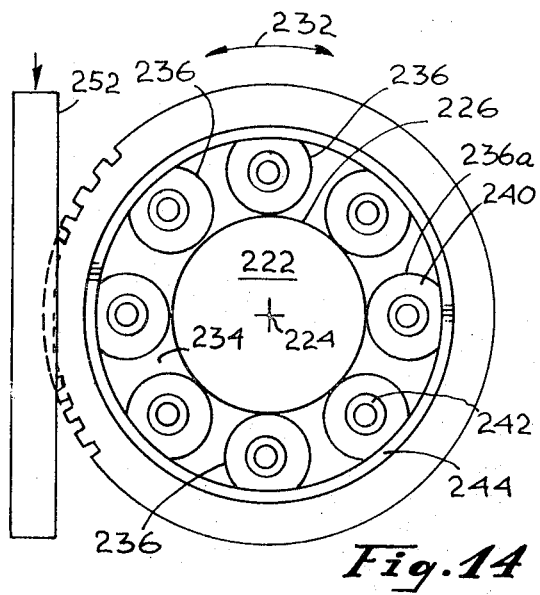
Fig. 14
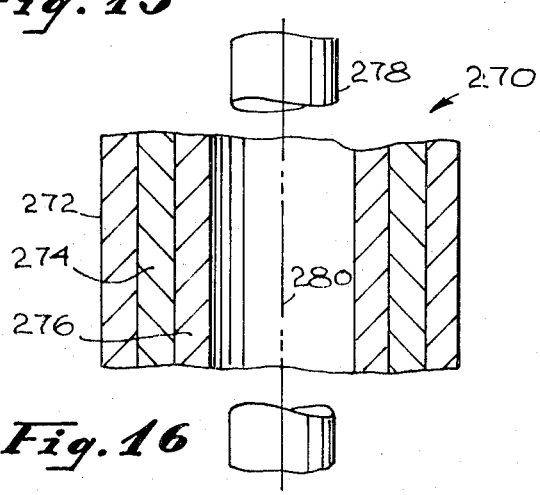
Fig. 16
Fig. 15
INVENTOR
DAVID L. PLATUS
BY
Don Finkelstein
ATTORNEY 3,647,028

ENERGY ABSORBING ARRANGEMENT

BACKGROUND OF THE INVENTION

1. Field of the Invention

This invention relates to the energy-absorbing art and, more particularly, to an improved energy-absorbing arrangement capable of providing comparatively high energy absorption.

2. Description of the Prior Art

In many energy-absorbing applications, it is desirable to absorb the energy associated with various phenomena involving relative motion of one member with respect to another. Such applications, of course, are quite prevalent and include, but are not limited to, elevator safety override devices, steering wheel arrangements for automobiles to provide energy absorption therefrom on impact in an accident, automobile bumper mountings, landing gear for aircraft and/or spacecraft, and the like.

Crushable or fragmenting tubes, honeycomb or cylindrical shells and other similar "one-shot" devices, have generally not been capable of providing the total energy absorption or the energy absorption rate desired in a convenient packing arrangement of sizes applicable to many of the above-described applications. Springs, on the other hand, while capable of many size modifications are generally of an energy absorbing and returning nature and do not, in a strict sense, absorb an appreciable amount of energy. Material transfer devices such as hydraulic shock absorbers, extrudable metal devices and the like, generally do not have a high absorption rate per unit weight or volume associated with the energy-absorbing device.

Various cyclic plastic deformation energy-absorbing devices, such as those employing rolling solid toroidal elements have comparatively high energy absorption characteristics per unit weight or volume but, in general, such devices provide extremely limited design flexibility. That is, for a given energy absorption and cycle life, the size and weight of such energy-absorbing arrangement is substantially fixed and in general requires comparatively high manufacturing tolerances. This, of course, results in a comparatively complex manufacturing technique and associated high manufacturing cost.

Consequently, there has long been a need for a comparatively lightweight, high energy absorption rate arrangement that allows considerable design flexibility and is comparatively insensitive to tolerance variations and yet is comparatively easy and low in cost to fabricate.

SUMMARY OF THE INVENTION

Accordingly, it is an object of applicant's invention herein to provide an improved energy-absorbing arrangement.

It is another object of applicant's invention herein to provide an energy-absorbing arrangement in which design flexibility is provided.

It is yet another object of applicant's invention herein to provide an energy-absorbing arrangement that is comparatively easy to fabricate and comparatively low in cost.

The above and other objects of applicant's invention herein are achieved, according to one embodiment of applicant's invention, by providing an energy-absorbing element compressed between a first body member and a second body member. The second body member is adapted to move in a preselected direction relative to said first body member maintaining the squeeze force on the energy-absorbing element.

In this embodiment of applicant's invention, the energy-absorbing element absorbs energy by the cyclic plastic deformation of a plurality of diametrally compressed tubelike or ringlike elements that are compressed along a diameter thereof.

The energy-absorbing element comprises an outer energy-absorbing member comprising a thin-walled cylindrical tubelike annular ductile metal member. The outer surface of the outer energy-absorbing member is in frictional rolling contact with the first bearing surface and the second bearing surface as rolled in the squeezed or diametrally deformed condition therebetween during the relative movement of the second body member with respect to the first. The energy-absorbing element also comprises at least a first inner energy-absorbing member concentrically positioned within the outer energy-absorbing member and the inner energy-absorbing member is adapted to roll about the common axis thereof with the outer energy-absorbing member, and the inner energy-absorbing member comprising a thin-walled cylindrical tubelike annular ductile metal member and the outer surface thereof is in contact with the inner surface of the outer energy-absorbing member.

The unstressed diametral dimension of the outer energy-absorbing member is greater than the spacing between the first body member and second body member, so that both the outer energy-absorbing member and inner energy-absorbing member are diametrally deformed by the first body member and second body member and are rolled therebetween during the relative movement in the deformed condition. Rolling in the deformed condition subjects the outer energy-absorbing member and inner energy-absorbing member to cyclic plastic deformation in which energy associated with the relative movement is absorbed.

The outer energy-absorbing member may have an axial dimension greater than the axial dimension of the inner energy-absorbing member, the axial dimensions of the outer and inner energy-absorbing members may be the same, or the outer energy-absorbing member may have an axial dimension less than the inner energy-absorbing member.

In other embodiments of applicant's invention, the relative motion between the first body member and second body member may be linear or it may be rotary.

In yet other embodiments of applicant's invention, additional inner energy-absorbing body members may be positioned within the tubelike inner energy-absorbing member and the other additional inner energy-absorbing members may be similar thereto and also absorb energy due to the cyclic plastic deformation thereof during the relative movement.

BRIEF DESCRIPTION OF THE DRAWINGS

FIG. 7 illustrates another energy-absorbing element useful in the practice of applicant's invention herein;

FIG. 8 illustrates another embodiment of applicant's invention herein;

FIGS. 9 and 10 illustrate another embodiment of applicant's invention herein;

FIG. 11 illustrates another embodiment of applicant's invention herein;

FIG. 12 illustrates another embodiment of applicant's invention herein;

FIGS. 13 and 14 illustrate another embodiment of applicant's invention herein;

FIG. 15 illustrates another energy-absorbing element useful in the practice of applicant's invention herein; and FIG. 16 illustrates another embodiment of applicant's invention herein.

DESCRIPTION OF THE PREFERRED EMBODIMENTS

Figure 2:
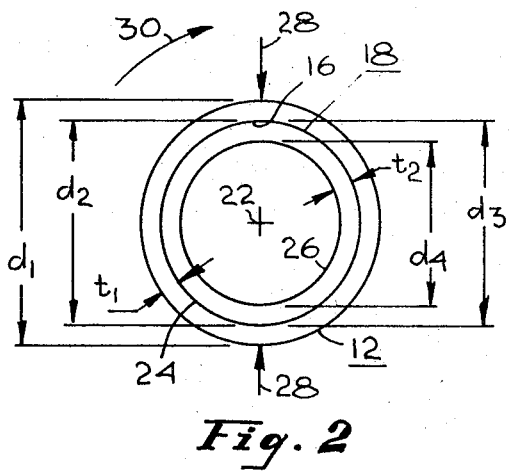
FIGS. 1 and 2 illustrate one embodiment of an energy-absorbing element useful in the practice of applicant's invention herein.

As noted above, applicant's improved energy-absorbing arrangement described herein absorbs energy by the cyclic deformation of material exhibiting hysteretic stress-strain behavior. Such energy absorption may be the cyclic plastic deformation of a ductile metal.

In applicant's invention herein, the ductile metal utilized as the energy-absorbing medium is generally in the form of a thin-walled cylindrical tubelike annular configuration having a preselected axial length. The member is diametrically compressed; that is, the member is compressed in the direction of its own diameter so that it is forced into a noncircular cross-sectional shape. The energy-absorbing element is strained well beyond its yield point and the relative motion of a first body member and second body member that provide the diametral compression produces cyclic plastic bending deformation of the energy-absorbing element thereby generating a substantially constant resisting force. Applicant prefers that the cylindrical energy-absorbing elements utilized in applicant's invention herein be thin-walled to provide the thin-walled stress-strain characteristics associated with the hysteretic stress-strain behavior. Variations in diameter and wall thickness, as well as other parameters specific to the detailed design of energy-absorbing structures utilizing applicant's improved energy-absorbing elements, are not critical and, consequently, a high degree of design is provided for both high and low energy-absorbing characteristics in small or large spaces as may be required.

In the cyclic plastic straining of a ductile metal in a fixed strain range, there is produced a hysteresis loop which stabilizes during the first few cycles. The repeated cycling results in almost constant energy absorption per cycle and until eventual fatigue failure. Since the plastic strain fatigue behavior of ductile metals generally follows a simple law relating plastic strain range, which may be considered the width of the hysteresis loop, and the fatigue life, the design characteristics combining the type of metal utilized for the energy-absorbing means and the diameter of the energy-absorbing means, the wall thickness of the energy-absorbing means and the amount of diametral compression thereon can provide variations in both the energy-absorbing characteristics as well as the length of life of the working energy-absorbing means until failure. Further, according to applicant's invention herein, the nesting of a plurality of similar thin-walled, tubular, cylindrical annularlike energy-absorbing members inside the outermost energy-absorbing member provides a great increase in energy-absorbing characteristics for a given design volume.

It will be appreciated that the narrower the hysteresis loop, which implies less energy absorption per cycle, the greater will be the number of cycles that the energy-absorbing element may be subjected to before failure. Consequently, the greater the number of cycles, the greater the total energy absorption of the device. By providing the nested arrangement of additional energy-absorbing elements, one within the other, in which each energy-absorbing member is thin-walled, a far greater energy absorption for a given weight of material can be obtained than can be obtained for a corresponding member having a thick wall equivalent to the sum of the thin walls.

Figure 1:
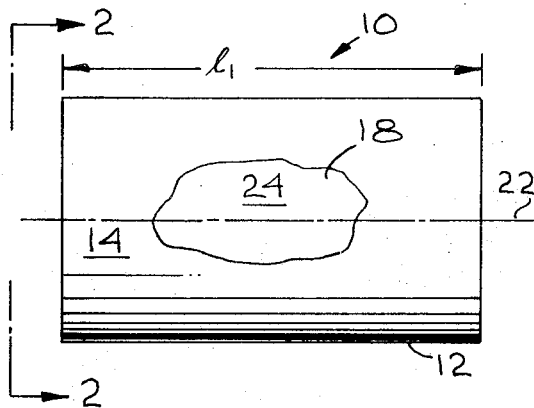

Referring now to FIGS. 1 and 2, there is shown one embodiment of an energy-absorbing element useful in the practice of applicant's invention herein. The energy-absorbing element, generally designated 10, comprises an outer energy-absorbing member 12 that is a thin-walled, cylindrical, tubelike, annular ductile metal member having a preselected wall thickness indicated by the letter $t_1$ and a preselected axial length indicated by the letter $l_1$.

The outer energy-absorbing member 12 has an outer surface 14 and an inner surface 16. The thickness $t_1$ is, of course, the distance between the outer surface 14 and inner surface 16. The outer energy-absorbing member 12 has a first preselected outer unstressed diametral dimension $d_1$ to the outer surface 14 and a first preselected inner unstressed diametral dimension $d_2$ to the inner surface 16 thereof.

Nested within the outer energy-absorbing member 12 is a first inner energy-absorbing member 18 that is concentrically mounted in the outer energy-absorbing member 12 to have a common body member axis 22 thereof. The first inner energy-absorbing member 18 is also a thin-walled, cylindrical, tubelike, annular ductile metal member and it has a preselected wall thickness $t_2$ between an outer surface 24 thereof and an inner surface 26 thereof. The outer surface 24 thereof is in substantially continuous contact, in this embodiment of applicant's invention, with the inner surface 16 of the outer energy-absorbing member 12.

The inner energy-absorbing member 18 has a second preselected outer unstressed diametral dimension to the outer surface 24 thereof, as indicated by the letter $d_3$, and the dimension $d_3$ is substantially the same as the dimension $d_2$ for the inner unstressed diametral dimension of the outer energy-absorbing member 12. Similarly, the inner energy-absorbing member 18 has an inner unstressed diametral dimension to the inner surface 26 thereof as indicated by $d_4$.

If a squeeze force in the diametral direction is applied to the energy-absorbing element 10, as indicated by the arrows 28, the outer energy-absorbing member 12 and inner energy-absorbing member 18 are subjected to a diametral squeeze force that deforms then diametrally and, if while being subjected to this squeeze force they are rotated in the direction indicated by the arrow 30 about their common axis 22, energy will be absorbed due to the cyclic deformation thereof. Further, if the deformation is in the plastic region of the materials from which the outer energy-absorbing member 12 and inner energy-absorbing member 18 are comprised, there will be a cyclic plastic deformation during such rolling motions.

In the embodiment of an energy-absorbing element 10 shown in FIGS. 1 and 2, the axial length of $l_1$ of the outer energy-absorbing member is also the axial length of the inner energy-absorbing member 18. Further, it will be appreciated, the ratio of the axial length of the energy-absorbing members of applicant's invention as described in the embodiments illustrated herein to the diameter thereof determines whether the element may be considered a tube or a ring. That is, if the ratio of the axial length to the diameter is 1:1 or less, then the energy-absorbing element may be considered a ring. If the ratio of the axial length to the diameter is greater than 1:1, the energy-absorbing element may be considered a tube. In the embodiments of applicant's invention shown herein, configurations thereof may include combinations of both inner and outer tube and ring members with corresponding outer and inner ring and tube members or any combinations thereof, as hereinafter set forth. It will be appreciated that the difference in designation is for convenience in description.

Figure 3:
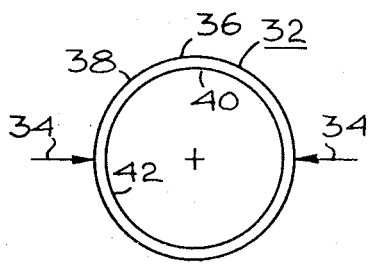
FIG. 3 illustrates a thin-walled energy-absorbing member useful in the practice of applicant's invention herein.
Figure 4:
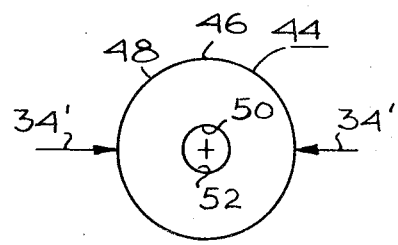
FIG. 4 illustrates a thick-walled energy-absorbing member.
Figure 5:
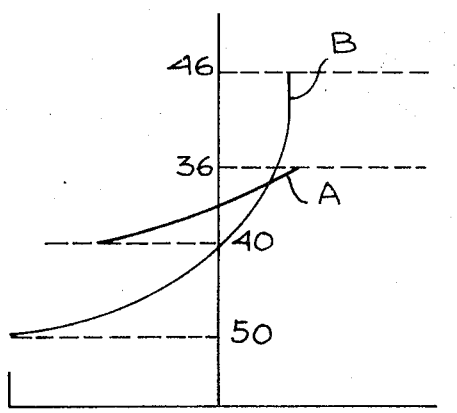
FIGS. 5 and 6 are graphical representations of various characteristics associated with applicant's invention herein.

FIGS. 3, 4 and 5 illustrate the principles of the cyclic plastic deformation of a thin-walled annular cylindrical ductile metal energy-absorbing element, as contrasted with a thick-walled cylindrical annular ductile metal energy-absorbing element. As shown, FIG. 3 illustrates a ductile metal thin-walled cylindrical annular energy-absorbing element which, for example, may be similar to either the outer energy-absorbing member 12 shown in FIG. 1, or the inner energy-absorbing member 18 shown in FIGS. 1 and 2. The element 32 shown in FIG. 3 is subjected to diametrally directed compressive forces indicated by the arrows 34 acting along a diameter thereof. As such, the energy-absorbing element 32 is subjected to a particular stress-strain relationship existing across the wall thickness from a point 36 on the outer surface 38 thereof to a point 40 on the inner surface 42 thereof. Curve A of FIG. 5 illustrates the strain distribution between the point 36 and point 40 across the wall of the energy-absorbing element 32. As shown on FIG. 5, it can be seen that Curve A is virtually a straight line and, therefore, the strain distribution across the wall thickness for a thin wall element is substantially linear. It will be appreciated that the thinner the wall with respect to the size of the diameter, the more nearly the Curve A in FIG. 5 approaches a true straight line. Since it is a desideratum to have a linear strain distribution across the wall, it can be seen that, according to principles of applicant's invention herein, the thin wall energy-absorbing element provides a close approximation to this desideratum. The more linear the strain distribution across the wall, the more optimum is the use of the material as an energy-absorbing element, and hence there is a greater fatigue life or a greater number of cycles until failure for a given specific energy absorption in the energy-absorbing element 32. Thus, by definition, each of the energy-absorbing members utilized in applicant's invention is thin-walled to provide a substantially linear relationship in the wall thereof at the desired stress loading. Applicant has found that this is generally achieved for most ductile metals when the ratio of wall thickness to outer diameter is equal to or less than one-tenth.

FIG. 4 illustrates a correspondingly thick-walled energy-absorbing element 44 subjected to diametrally directed squeeze forces 34' along a diameter thereof, and the magnitude of the forces illustrated by the arrows 34' is much greater than the magnitude of the forces illustrated by the arrows 34 in FIG. 3 for the same given specific energy absorption characteristic as for the thin-walled member 32. Under such diametrally compressive forces 34', the energy-absorbing element 44 is subjected to particular stress and strain distributions in the wall thereof from a point 46 on the outer surface 48 thereof to a point 50 on the inner surface 52 thereof.

Curve B in FIG. 5 illustrates the strain distribution across the wall from the point 46 to the point 50 for the energy-absorbing element 44.

From the above curves it can be seen that the strain at point 36 for the element 32 shown in FIG. 3 is approximately equal, though, of course, of opposite sign, to the strain at the point 40 on the inside surface 42. However, for the thick-walled element 44 shown in FIG. 4, as illustrated in Curve B of FIG. 5, it can be seen that there is a much greater strain at the point 50 on the inside surface 52 than at the point 46 on the outside surface 48. Therefore, the thick-walled energy-absorbing element 44 is not considered to have a linear strain distribution across the wall and thereby results in a less optimum use of material. Consequently, for the same specific energy absorption as required in the thin-walled energy-absorbing element 32 of FIG. 3, the thick-walled element 44 shown in FIG. 4 will have a much shorter fatigue life until failure thereof.

Figure 6:
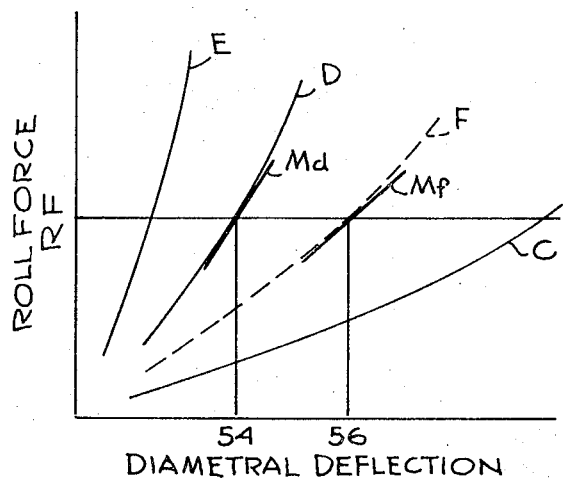

FIG. 6 illustrates another characteristic of the thin-walled energy-absorbing elements of applicant's invention herein. As shown on FIG. 6, there is illustrated the relationship between the diametral deflection and the required roll force. The roll force may be defined as the force necessary to roll the energy-absorbing element, such as the energy-absorbing element 10 shown in FIGS. 1 and 2, in a direction indicated by the arrow 30 while subjected to the squeeze forces illustrated by the arrows 28. The diametral deflection may be defined as the difference between, for example, the diameter $d_1$ which is the unstressed diameter to the outer surface 14 of the energy-absorbing member 12 shown in FIGS. 1 and 2, and the stressed diameter which is less than the unstressed diameter when the energy-absorbing element 10 is subjected to the squeeze forces 28. The Curve C in FIG. 6 represents the relationship for an energy-absorbing member having a first wall thickness, the Curve D of FIG. 6 represents the relationship for an energy-absorbing element with a greater wall thickness than the element illustrated by the Curve C, and the Curve B represents the relationship for an energy-absorbing element having a greater wall thickness than the energy-absorbing element represented by the curve of FIG. D. The Curve D represents a single thick-walled energy-absorbing element having a wall thickness equivalent to twice the wall thickness of the energy-absorbing element illustrated by the curve C on FIG. 6.

The dashed line Curve F of FIG. 6 represents the relationship for an energy-absorbing element similar to the energy-absorbing element 10 shown in FIGS. 1 and 2, wherein the sum of the wall thicknesses $t_1$ and $t_2$ for the outer energy-absorbing element 12 and inner energy-absorbing element 18 is equivalent to twice the thickness of the energy-absorbing element illustrated by the Curve C of FIG. 6 and, therefore, has the same total wall thickness as the wall thickness of the energy-absorbing element illustrated by the Curve D of FIG. 6. From FIG. 6, therefore, it can be seen that for a given roll force RF, the diametral deflection 54 in the single thick-walled element illustrated by the Curve D is less than the deflection 56 required by produce the same roll force RF for the two thin-walled nested energy-absorbing elements. Further, it can be seen that the slope $M_d$ for the element represented by the Curve D is significantly greater than the slope $M_f$ of the Curve F for the two thin-walled elements. Hence, variations in energy absorption or roll force with diametral deflection or tolerance changes will be less for the two thin-walled elements than for the thick-walled element. Therefore, dimensional tolerances for the two thin-walled energy-absorbing elements can be comparatively looser and thus more nearly uniform energy absorption and roll force characteristics can be obtained utilizing high mass production fabrication techniques.

Also, since the squeeze forces necessary to produce a particular specific energy absorption or roll force are lower for the two thin-walled nested elements, as illustrated by the Curve F, than for the single thick-walled element, as illustrated by the Curve D, there are lower bearing stresses on the external surface of the outer energy-absorbing member. Consequently, the lower forces can be produced by a smaller and lighter energy-absorbing arrangement and less damage occurs during utilization, as hereinafter set forth, and consequently a greater life to an energy-absorbing arrangement utilizing such an energy-absorbing element results. Therefore, by utilizing two thin-walled members having the same total wall thickness as one thick-walled member, a more optimum strain distribution results and considerably lower squeeze forces are required to produce the same average specific energy absorption and hence roll force. This results in a lighter weight structure and much longer cycle life for the same specific energy absorption per cycle. Conversely, for a given size and weight of the structure there is a greater energy absorption and cycle life.

The above description of the physical characteristics associated with the thin-walled energy-absorbing elements of applicant's invention herein has been presented to enable a more thorough understanding of the embodiments of applicant's invention as hereinafter set forth.

For convenience, applicant prefers to define a thin-walled energy-absorbing member as one in which the ratio of the wall thickness to the outer diameter is one-tenth or less. Similarly, a thick-walled energy-absorbing element is one in which the ratio of the wall thickness to the outside diameter is greater than one-tenth. However, as can be seen from FIG. 6, the physical characteristics are not sharply defined but blend one into the other as the thickness of the wall with respect to the outside diameter increases. Therefore, of course, in some applications of applicant's invention herein in utilizing the principles as taught by applicant, it may be desirable to utilize two comparatively thick-walled elements nested one inside the other to provide specific energy absorption characteristics for a given application. However, it will be appreciated that in the preferred embodiment of applicant's invention, all of the energy-absorbing members are preferably thin-walled to provide the more linear strain distributions across the wall thickness.

Referring now to FIG. 7, there is shown a perspective view of an energy-absorbing arrangement generally designated 60 utilizing an energy-absorbing element 62 according to the principles of applicant's invention herein. As shown in FIG. 7, the energy-absorbing arrangement 60 comprises a first body member 64 having a first bearing surface 66. There is also provided a second body member 68 having a second bearing surface 70 spaced a predetermined distance from the first bearing surface 66 of the first body member 64. As can be seen from FIG. 7, the first bearing surface 66 of the first body member 64, and the second bearing surface 70 of the second body member 68, are substantially coextensive and overlap to define a particular area therebetween. The second body member 68 is adapted to move relative to the first body member 64 in the linear direction indicated by the arrow 72. That is, the second body member 68 is adapted to move in both linear directions indicated by the arrow 72 under the influence of forces acting thereon.

The energy-absorbing element 62 is positioned between the first body member 64 and second body member 68 in an energy-absorbing cavity 65 therebetween, and the energy-absorbing element 62 has an outer energy-absorbing member 74 which, for example, may be similar to the outer energy-absorbing member 12 shown in FIGS. 1 and 2. Similarly, the energy-absorbing element 62 also has a first inner energy-absorbing member 76 positioned concentrically within the outer energy-absorbing member 74 to have a common body member axis 78.

The outer energy-absorbing element 74 has an outer surface 80 that bears against the first bearing surface 66 of the first body member 64 and second bearing surface 70 of the second body member 68, and the energy-absorbing element 62 is adapted to roll between the first bearing surface 66 and second bearing surface 70 for the condition of relative motion of the second body member 68 in the directions indicated by the arrow 72.

As noted above, the outer energy-absorbing member 74 is similar to the outer energy-absorbing member 12 shown in FIGS. 1 and 2, and as such is a thin-walled cylindrical annular member having a first preselected outer unstressed dimension to the outer surface 80 that is greater than the predetermined spacing between the first bearing surface 66 of the first body member 64 and second bearing surface 70 of the second body member 68. Therefore, the first body member 64 and second body member 68 exert diametral compressive forces along a diameter of the energy-absorbing element 62 in the direction indicated by the arrows 82. The diametral compressive forces, as illustrated by the arrows 82, subject the energy-absorbing element 62 to cyclic plastic deformation and, during the relative motion of the second body member 68 with respect to the first body member 64 in the direction indicated by the arrow 72, the energy-absorbing element 62 undergoes rolling motion therebetween and is therefore subjected to cyclic plastic deformation.

Since the unstressed diametral dimension to the outer surface 80 of the outer energy-absorbing member 74 is greater than the predetermined spacing between the first bearing surface 66 of the first body member 64, and second bearing surface 70 of the second body member 68 for the energy-absorbing element 62 contained therebetween, the outer energy-absorbing member 74 is diametrally dimensionally deformed to a stressed condition by the forces indicated by the arrows 82 to a first preselected stressed outer diametral dimension that is less than the first preselected unstressed outer diametral dimension. Similarly, the outer energy-absorbing member 74 has an inner surface 84 that has a first preselected unstressed diametral dimension that is greater than the inner-stressed dimension thereof when subjected to the diametral compressive forces indicated by the arrows 82.

The inner energy-absorbing member 76 has an outer surface 86 that is in substantially continuous contact with the inner surface 84 of the outer energy-absorbing member 74 and, as noted above, may be similar to the inner energy-absorbing member 18 shown in FIGS. 1 and 2 and is, therefore, a thin-walled cylindrical annular duc,ile metal energy-absorbing member that rolls with the outer energy-absorbing member 74 about the common axis 78. The diametral compressive forces 82 cause a diametral deformation of the inner energy-absorbing member 76. The inner energy-absorbing member 76 has a second preselected outer unstressed diametral dimension to the outer surface 86 thereof that is substantially the same as the first preselected inner unstressed diametral dimension to the inner surface 84 of the outer energy-absorbing member 74. Similarly, the inner energy-absorbing member 76 has a second preselected inner unstressed diametral dimension to the inner surface 88 thereof.

Under the influence of the diametral compressive forces 82, the outer energy-absorbing member 74 diametrally deforms the inner energy-absorbing element 76 to a second preselected outer stressed diametral dimension to the outer surface 86 thereof that is less than the second preselected unstressed diametral dimension thereof, and a second preselected inner stressed diametral dimension to the inner surface 88 thereof that is less than the second preselected unstressed inner diametral dimension.

Therefore, for the condition of the energy-absorbing element 62 subjected to the diametrally compressive forces indicated by the arrows 82 from the first body member 64 and second body member 68, during the relative motion of the second body member 68 with respect to the first body member 64 in the direction of the arrow 72, the energy-absorbing element 62 and, therefore, the outer energy-absorbing member 74 and inner energy-absorbing member 76 roll about the preselected axis 78 in the directions indicated by the arrow 90, and also, of course, translates in the directions indicated by the arrow 72 during the relative motion. Since both the outer energy-absorbing member 74 and inner energy-absorbing member 76 are deformed in the plastic deformation range thereof, the rolling motion about the axis 78, as indicated by the arrow 90, produces cyclic plastic bending deformation for absorption of the energy associated with the relative movement of the second body member 68 with respect to the first body member 64.

A substantially incompressible, nondeformable, cylindrical member 92 may be positioned interior the inner energy-absorbing member 76, and the cylindrical member 92 has a predetermined diametral dimension that is less than the unstressed inner diametral dimension of the inner energy-absorbing member 76. The incompressible member 92 acts as a limit device for limiting the diametral deflection of the inner energy-absorbing member 76, and, therefore, also the outer energy-absorbing member 74. Applicant has found, as indicated in U.S. Pat. No. 3,435,919 that by limiting the amount of diametral deformation, the stress relieving plastic flow of the inner energy-absorbing member 76 and outer energy-absorbing member 74 may be substantially eliminated during the times between utilization of the energy-absorbing device 60. It will be appreciated that similar incompressible nondeformable cylindrical members may be utilized in any of the embodiments of applicant's invention described herein.

In the energy-absorbing element 10 shown in FIG. 1 and FIG. 3, and 62, shown in FIG. 7, there have been provided an outer energy-absorbing member and an inner energy-absorbing member. Applicant's invention herein is not restricted to merely a nested arrangement of two energy-absorbing members but, it will be appreciated, that additional nested energy-absorbing members may be added as desired. FIG. 8 illustrates an energy-absorbing element generally designated 100 comprised of an outer energy-absorbing member 102 and a first inner energy absorbing member 104. The outer energy-absorbing member 102 may be similar to the outer energy-absorbing member 74, shown in FIG. 7, and the first inner energy-absorbing member 104 may be similar to the inner energy-absorbing member 76, shown in FIG. 7.

However, in the energy-absorbing element 100, there is also provided a plurality of secondary ductile metal, thin-walled, cylindrical annular energy-absorbing members 106 and 108. Thus, in the embodiment of applicant's invention shown in FIG. 8, the energy-absorbing element 100 has four thin-walled, ductile metal, cylindrical annular energy-absorbing members concentrically mounted together about a common body axis 110 in sequential surface contact. That is, the outer surface of each of the inner energy-absorbing member 104 and plurality of secondary energy-absorbing members 106 and 108 are in substantially continuous surface contact with the inner surface of the outer energy-absorbing member 102, inner energy-absorbing member 104 and secondary energy-absorbing members 106, respectively. The energy-absorbing arrangement 100 showing the four energy-absorbing members 102, 104, 106 and 108 is not a limitation upon the number of similar energy-absorbing members that may be assemblied in a nested arrangement. It will be appreciated that greater than four may also be utilized for applications as may be desired.

The energy-absorbing element 100 may be utilized in place of the energy-absorbing element 62 shown in FIG. 7 and, when subjected to diametral compressive forces as indicated in by the arrows 112, would be subjected to plastic deformation, and during relative movement of the body members applying the plastic deformation forces 112, would be subjected to cyclic plastic deformation to absorb the energy associated with such relative movement.

In the embodiment of applicant's energy-absorbing arrangements described above, it can be seen that the energy-absorbing elements are generally cylindrical and tubular. Applicant's invention may also be utilized in other arrangements wherein the energy-absorbing elements are in the form of a toroid. FIGS. 9 and 10 illustrate one such embodiment of applicant's invention generally designated 120. As shown in FIGS. 9 and 10, the energy-absorbing arrangement 120 is comprised of a first body member 122 having a first bearing surface 124. The surface 124 comprises a generally cylindrical surface. For convenience, it may be considered that the first body member 122 is fixed.

A second body member 126 having a bearing surface 128 which, in this embodiment of applicant's invention is an outer peripheral surface of the generally cylindrical member 126. The second body member 126 is concentrically mounted on axis 130 with the first body member 122. The second body member 126 is adapted to move in linear directions as indicated by the arrow 132 with respect to the first body member 124, such movement being parallel to the common axis 130.

There is defined between the first bearing surface 124 and second bearing surface 128 an annular energy-absorbing element receiving cavity 134. A plurality of energy-absorbing elements 136 are positioned in the annular energy-absorbing element receiving cavity 134 and, as shown on FIG. 9, are arranged in three energy-absorbing element rows 136a, 136b and 136c. In this embodiment of applicant's invention, each of the energy-absorbing rows is comprised of a plurality of the energy-absorbing elements 136 which, as shown more clearly in FIG. 10, are a plurality of ring-type energy-absorbing elements according to the principles of applicant's invention herein. That is, each energy-absorbing element 136 is comprised of an outer energy-absorbing element 138 and an inner energy-absorbing element 140. The outer energy-absorbing element 138 may be similar to the outer energy-absorbing element 12 described above in connection with FIGS. 1 and 2, and the inner energy-absorbing element 140 may be similar to the inner energy-absorbing element 18 described above in connection with FIGS. 1 and 2. However, in the arrangement shown in FIGS. 9 and 10, the axial length of the energy-absorbing members 138 and 140 is equal to or less than the outer unstressed diametral dimension to the outer surface 142 of the outer energy-absorbing member 138. Thus, within the definition above specified, the energy-absorbing elements 136 may be considered to be ring-type energy-absorbing elements. The inner energy-absorbing member 140 is concentrically positioned within the outer energy-absorbing member in each of the energy-absorbing elements 136 and is adapted to roll therewith about their common axis, and each has its outer surface in substantially continuous contact with the inner surface of the outer energy-absorbing member 138. The outer energy-absorbing member 138 has an unstressed diametral dimension to the outer surface 142 thereof that is greater than the predetermined annular spacing indicated by the letter $s$ in FIG. 9 between the first bearing surface 124 on the first body member 122 and the second bearing s$rface 128 on the second body member 126. Therefore, each of the outer energy-absorbing members 138 and inner energy-absorbing members 140 of each of the energy-absorbing elements 136 are diametrally compressed along a diameter thereof to be plastically deformed and, during the relative movement of the second body member 126 relative to the first body member 124 in the directions indicated by the arrow 132, each of the energy-absorbing elements 136 rolls about its common axis and, therefore, undergoes cyclic plastic bending deformation for the absorption of energy during such motion.

If desired, a substantially incompressible, nondeformable annular retainer member 150 may be positioned within the inner energy-absorbing element 140 to limit the amount of diametral deformation thereof and prevent plastic flow and creep in a manner similar to the member 92 shown in FIG. 7.

Since each of the inner energy-absorbing elements 140 and outer energy-absorbing elements 138 are thin-walled ringlike members, there is a comparatively large energy absorption per unit weight of energy absorption element 136 due to the thin-walled stress-strain relationship as described above in connection with FIG. 6. In modifications of this embodiment, there may be provided a plurality of outer energy-absorbing members on each inner energy-absorbing member wherein the outer energy-absorbing members have an axial length less than the axial length of the inner energy-absorbing member.

It will be appreciated that for linear stroke arrangements such as that illustrated in FIGS. 9 and 10, or, as described below, for rotary stroke energy-absorbing arrangements, applicant's invention herein also comprises utilization of a plurality of inner energy-absorbing arrangements. FIG. 11 illustrates one such embodiment of applicant's invention generally designated 160. In the energy-absorbing arrangement 160 which, generally, may be a linear stroke arrangement similar to the energy-absorbing arrangement 120 shown in FIGS. 9 and 10, there is provided a first body member 162 having a first bearing surface 164 that may be similar, respectively, to the first body member 122 and first bearing surface 124 described above. Similarly, a second body member 166 having a second bearing surface 168 is provided and may be similar to the second body member 126 and second bearing surface 128 described above. There is provided an annular energy-absorbing element receiving cavity 172 between the first bearing surface 164 and second bearing surface 168, and they are spaced apart a distance $s'$. The second body member 166 is adapted to move linearly with respect to the first body member 162 in directions into and out of the plane of the paper.

A plurality of energy-absorbing elements 170 are contained in the annular space 172 between the first bearing surface 164 and second bearing surface 168. Each of the energy-absorbing elements 170 is comprised of an outer, thin-walled, cylindrical, ringlike, annular, ductile metal energy-absorbing member 174 which, in this embodiment of applicant's invention, has an axial-length-to-outer-diameter-ratio less than one and, therefore, as described above, may be considered a ring 174. The outer energy-absorbing member 174 has a first preselected outer unstressed diametral dimension to an outer surface 175 thereof that is greater than the spacing $s'$ and, therefore, the outer energy-absorbing member 174 is subjected to a diametrally compressive force between the first bearing surface 164 and the second bearing surface 168 that, for the position shown in FIG. 11, deforms the outer energy-absorbing member 174 in the plastic deformation range thereof.

The outer surface 175 of the outer energy-absorbing member 174 is adapted to roll on the first bearing surface 164 and second bearing surface 168 during the above-described relative motion between the first body member 162 and second body member 166. A first inner energy-absorbing member 176 is also a thin-walled, cylindrical, ringlike annular ductile metal member and, as noted above, may be considered, in this embodiment of applicant's invention, a ring member. The first inner energy-absorbing member 176 has a predetermined wall thickness and an axial length coextensive with the axial length of the outer energy-absorbing member 174. The inner energy-absorbing member 176 is concentrically mounted about a common body axis 180 with the outer energy-absorbing member 174 and has an outer surface in substantially continuous contact with the inner surface of the outer energy-absorbing member 174. Consequently, as described above, the inner energy-absorbing member 176 is also diametrally compressed in the plastic deformation region thereof by the diametral forces exerted on the outer energy-absorbing member 174 from the first body member 162 and second body member 166. Therefore, during rolling of the energy-absorbing element 170 about the common body axis 180, both the outer energy-absorbing member 174 and inner energy-absorbing member 176 undergo cyclic plastic bending deformation and thereby absorb energy during the above-described relative movement between the first body member 162 and second body member 166.

In the energy-absorbing arrangement 160 shown in FIG. 11, there are also provided a plurality of secondary ductile metal, thin-walled, cylindrical ringlike, annular energy-absorbing members 182 and 184 that are concentrically mounted together and in substantial sequential surface contact and mounted interior the inner energy-absorbing member 176 for concentric mounting on the common body axis 180. Each of the secondary energy-absorbing members 182 and 184 in each of the energy-absorbing elements 170 have substantially coextensive axial lengths with the outer energy-absorbing member 174 and inner energy-absorbing member 176. Each of the secondary energy-absorbing members 182 and 184 are diametrally compressed in the plastic deformation region thereof and roll with the outer energy-absorbing member 174 and the inner energy-absorbing member 176 about the common body axis 180, and in such rolling absorb energy by the cyclic plastic deformation thereof.

A substantially incompressible, nondeformable, toroidal retainer member 186 may be utilized, if desired, to limit the amount of diametral deformation of the energy-absorbing element 170 in a manner similar to the member 150 shown in FIG. 10 and described above.

Applicant has found that in some applications of applicant's invention herein, such as the arrangement shown in FIG. 11, there may be a tendency under some operational conditions for the inner energy-absorbing member 176 and/or secondary energy-absorbing members 182 and 184 to leave their coextensive axial positions with the outer energy-absorbing element 174 and be dislodged therefrom. Accordingly, applicant prefers to utilize a restraining means to hold all of the energy-absorbing members in the above-described axially aligned condition to prevent axial migration. One arrangement for a restraining means is illustrated in FIG. 11 wherein the wall thicknesses of adjacent corresponding energy-absorbing members of adjacent energy-absorbing elements are varied so that axial migration of any one energy-absorbing member is substantially precluded. Thus, in the energy-absorbing element 170a, the wall thickness of each of the energy-absorbing members 174, 176, 182 and 184 may be different from the wall thickness of the corresponding energy-absorbing members 174b, 176b, 182b and 184b in the energy-absorbing element 170b. Thus, by staggering the wall thicknesses of the corresponding energy-absorbing members, axial translation of any of the energy-absorbing members relative to the outer energy-absorbing member is precluded.

The energy-absorbing element 170a', having similar energy-absorbing members to the energy-absorbing element 170a, may also be provided with energy-absorbing members having the same wall thicknesses as the energy-absorbing members 174, 176, 182 and 184 in energy-absorbing element 170a. It will be appreciated that the angular divergence of members 170a, 170b and 170a' has been exaggerated in FIG. 11 for illustrative purposes.

The use of multiple energy-absorbing elements is not confined to linear energy-absorbing arrangements similar to those shown in FIGS. 9, 10 and 11, wherein the action is akin to a piston in a cylinder. Rather, applicant's invention herein may also be utilized in linear energy-absorbing elements between two plates, as shown in FIG. 7, wherein a tubelike energy-absorbing element 162 was utilized. FIG. 12 illustrates an embodiment of applicant's invention in which an energy-absorbing arrangement, generally designated as 190, is provided with a first body member 192 having a first bearing surface 194 and a second body member 196 having a second bearing surface 198. The first body member 192 and second body member 196 are, in this embodiment of applicant's invention, substantially coplanar, and the second body member 196 moves relative to the first body member 192 in directions indicated by the arrow 200. The first body member 192 is spaced a preselected distance from the second body member 196 so that there is a predetermined spacing between the first bearing surface 194 and second bearing surface 198, and a plurality of energy-absorbing elements 202 are positioned in the space intermediate the first bearing surface 194 and second bearing surface 198.

Each of the elements 202 may be similar to the energy-absorbing elements 170, shown in FIG. 11, and may be comprised of an outer energy-absorbing member 204, an inner energy-absorbing member 206 and a plurality of secondary energy-absorbing members 208 and 210. A rigid, nondeformable, cylindrical retainer member 212 may, if desired, be provided to limit the diametral deformation of the energy-absorbing elements 202. Each of the energy-absorbing members 204, 206, 208 and 210 is concentrically mounted about a common body axis 214 and is adapted to roll on the first bearing surface 194 and second bearing surface 198 during the relative motion of the second body member 196, with respect to the first body member 192 in the direction indicated by the arrow 200. The outer energy-absorbing member 204 has an unstressed diametral dimension that is greater than the preselected spacing between the first bearing surface 194 and second bearing surface 198 so that the outer energy-absorbing member 204, inner energy-absorbing member 206 and plurality of secondary energy-absorbing members 208 and 210 are diametrally compressed in the plastic deformation region thereof by the first body member 192 and second body member 196 and, during the above-described rolling action, undergo cyclic plastic deformation during the relative movement of the second body member 196 with respect to the first body member 192. In order to prevent axial migration of any of the energy-absorbing members 206, 208 or 210 with respect to the outer energy-absorbing member 204, applicant, in this embodiment of applicant's invention, also prefers to utilize a retainer means. As shown, there is provided a washer-like member 216 intermediate the energy-absorbing element 202a and 202b. It will be appreciated that similar washerlike members 216 may be positioned between other adjacent energy-absorbing elements that are positioned within the space between the first bearing surface 194 and second bearing surface 198.

In the embodiment of applicant's invention as described above, applicant has described the utilization of the improved energy-absorbing structure in linear motion energy-absorbing arrangements. It will be appreciated, of course, that applicant's invention is not limited to such linear energy-absorbing arrangements but may equally well be utilized in rotary energy-absorbing arrangements. FIGS. 13 and 14 illustrate one embodiment of applicant's invention, generally designated as 220, of such an energy-absorbing arrangement in which there is provided a first body member 222 that is generally cylindrical and has an axis 224 and a first bearing surface 226. Concentrically mounted about the axis 224 is the second body member 228 having a second bearing surface 230, and the second body member 228 is adapted to a move in a rotary direction as indicated by the arrow 232 about the common axis 224 with respect to the first body member 222. The first bearing surface 226 is spaced a preselected distance from the second bearing surface 230 and defines an annular energy-absorbing element receiving cavity 234 therebetween. A plurality of energy-absorbing elements 236 are positioned in the energy-absorbing element receiving cavity 234, and, in this embodiment of applicant's invention, each of the energy-absorbing elements 236 has an axis such as axis 238 that is parallel to the common axis 224. While any of the above-described types of energy-absorbing elements could be utilized as the energy-absorbing elements 236, in this embodiment of applicant's invention, applicant shows an energy-absorbing element 236 having a plurality of outer energy-absorbing members 240, each comprising a thin-walled, cylindrical, annular member having a preselected wall thickness and a first preselected axial length. In this embodiment of applicant's invention, each of the outer energy-absorbing elements 240 is similar and may, if desired, be a ring. It will be appreciated that applicant describes herein the details of the particular energy-absorbing element 236a and that each of the other energy-absorbing elements 236 is similar thereto.

Each of the outer energy-absorbing members 240 has an outer surface that is in rolling contact with the first bearing surface 226 and second bearing surface 230. Further, each of the outer energy-absorbing members 240 has a first preselected outer unstressed dimension to the outer surface thereof that is greater than the predetermined annular distance between the first bearing surface 226 and second bearing surface 228, so that each of the outer energy-absorbing members 240 is diametrally dimensionally deformed in the plastic deformation range thereof to a stressed condition by the first body member 222 and second body member 228.

In each of the energy-absorbing elements 236, there is also provided an inner energy-absorbing member 242 that is concentrically mounted about the common axis 238 thereof, and the inner energy-absorbing member 242 is a thin-walled, cylindrical tubelike annular ductile metal member having a second preselected wall thickness and a second preselected axial length. In this embodiment of applicant's invention, as shown on FIG. 13, the axial length of the inner energy-absorbing member 242 is much greater than the axial length of any of the outer energy-absorbing members 240. Thus, the entire inner surface of each of the outer energy-absorbing members 240 is in substantial continuous contact with the outer surface of the inner energy-absorbing member 242 and, therefore, in at least the coextensive surface contact regions therebetween, the inner energy-absorbing member 242 is diametrally compressed by the outer energy-absorbing member to a stressed diametral dimension that is less than the unstressed diametral dimension and thereby is deformed in the plastic deformation region thereof.

In order to prevent axial migration of any of the outer energy-absorbing members 240, it will be appreciated that retainer means may be utilized. As shown in FIGS. 13 and 14, applicant prefers to include cylindrical retainer members 244 in the first end 246 and in the second end 248 of the energy-absorbing arrangement 220, and retainers 244 may be a press fit against the bearing surface 230. A plurality of tubelike retainer members 250 may be positioned intermediate each of the adjacent outer energy-absorbing members 240. The tubelike members 250 are not subjected to a stressed loading and are not intended in this embodiment of applicant's invention to be an energy-absorbing member. The function of the tubelike members 250 is merely to retain the desired axial position of each of the outer energy-absorbing members 240 on the inner energy-absorbing member 242.

A rack member 252 engages the second body member 228 and rotates it in the direction indicated by the arrow 232. During this rotational movement of the second body member 228 with respect to the first body member 222, each of the energy-absorbing elements 236 is rotated about its common axis 238 and rolls on the first bearing surface 226 and second bearing surface 230, and thus each of the outer energy-absorbing members 240 and inner energy-absorbing members 242 is subjected to cyclic plastic deformation during the rolling motion and absorbs energy associated with the rotary relative motion of the second body member 228 with respect to first body member 222. A reset arrangement, such as described in U.S. Pat. No. 3,426,869 may be provided, if desired.

It will be appreciated that many variations in the combinations of axial length and axial number of nested energy-absorbing members may be provided as desired. For example, FIG. 15 illustrates an energy-absorbing element 260 which could be utilized in the embodiment of applicant's invention shown in FIGS. 13 and 14 in place of the energy-absorbing element 236. The energy-absorbing element 260 has a plurality of outer energy-absorbing members 262 which may be similar to the outer energy-absorbing members 240, and an inner energy-absorbing member 264 which may be similar to the inner energy-absorbing member 242 shown in FIG. 13. However, in this embodiment of applicant's invention, there is also provided a plurality of secondary energy-absorbing members 266 which are positioned interior the inner energy-absorbing member 264 in substantially continuous surface contact therewith.

When the energy-absorbing element 260 is subjected to diametrically directed compressive forces, each of the energy-absorbing members 262, 264 and 266 is diametrally compressed in the plastic deformation region thereof and is subjected to a rolling motion and undergoes cyclic plastic deformation for the absorption of energy. It can be seen that the axial length of the outer energy-absorbing member 262 is less than the axial length of the inner energy-absorbing member 264 and, further, that the axial length of the secondary energy-absorbing members 266 may be the same as the axial length of the outer energy-absorbing members 262, or, if desired, they could be different lengths.

It will be appreciated that the energy-absorbing members in an energy-absorbing element for use in a rotary energy-absorbing structure, such as shown in FIGS. 13, 14 and 15, could all be of substantially the same axial length. FIG. 16 illustrates such an energy-absorbing element generally designated 270 in which there is provided an outer energy-absorbing member 272, an inner energy-absorbing member 274 and a secondary energy-absorbing member 276, each of which may be thin-walled, cylindrical, tubelike, annular and energy-absorbing members in sequential surface contact. A cylindrical rigid nondeformable retainer member 278 may, if desired, be provided in the energy-absorbing element 270 to limit the diametral deformation of the energy-absorbing members 272, 274 and 276. In this embodiment of applicant's invention, each of the energy-absorbing members 272, 274 and 276 may be considered tubular rather than ringlike and, when subjected to diametrically compressive forces, undergo a plastic deformation, and, when rotated about their common axis 280, undergo cyclic plastic deformation for the absorption of energy.

This concludes the description of applicant's invention of the improved energy-absorbing arrangement. From the above, it can be seen that applicant has provided an improved energy-absorbing arrangement in which a much higher energy absorption per unit weight can be provided by the plurality of thin-walled energy-absorbing members than in an equivalent wall thickness single-walled element. As a result, there is a more linear strain distribution having a much lower slope on the rolling force-diametral deformation curve. Therefore, the energy-absorbing arrangements may be fabricated with comparatively wide tolerances and are comparatively insensitive to tolerance variations. Further, utilization of a plurality of thin-walled energy-absorbing elements provides a much greater deflection for a given squeeze force and, therefore, much greater energy absorption for the same squeeze force providing the diametral compressive deformation thereof. Conversely, for the same energy absorption capability, lower squeeze forces are required for a plurality of nested thin-walled energy-absorbing structures than for a single thick-walled energy-absorbing structure.

It will be appreciated that, while applicant has described the outer surface of the inner energy-absorbing members as being in substantially continuous surface contact with the inner surface of the outer energy-absorbing member, the greater the deflection of the energy-absorbing element and corresponding deformation into an oval shape, the region of surface contact is concentrated along the minor axis of such an oval shape and there may be little or no surface contact in regions along the major axis. Such a phenomena also may occur in the secondary energy-absorbing elements. However, it is the regions in which there is surface contact that provides the transmission of the forces from the outer to the inner and/or secondary energy-absorbing members.

What is claimed is:

1. In an energy-absorbing arrangement of the type adapted to absorb energy by cyclic plastic deformation, the improvement comprising, in combination:
 a first body member having a first bearing surface;
 a second body member having a second bearing surface spaced a predetermined distance from said first bearing surface on said first body member to define an energy-absorbing element receiving cavity therebetween;
 at least a first portion of said second bearing surface coextensive with a first portion of said first bearing surface to define an overlap portion therebetween, and said second body member for relative movement in a preselected direction relative to said first body member;
 a first energy-absorbing element comprising:
  at least one outer energy-absorbing member positioned intermediate said first bearing surface of said first body member and said second bearing surface of said second body member in said overlap area for rolling motion between said first body member and said second body member for the condition of said relative movement of said second body member with respect to said first body member in said preselected direction, and said at least one outer energy-absorbing member comprising:
   a thin-walled, cylindrical, tubelike annular ductile metal member having a first preselected wall thickness and a first preselected axial length;
   an outer surface for rolling engagement with said first and said second bearing surfaces of said first body member and said second body member respectively;
   an inner surface;
   a first preselected outer unstressed diametral dimension to said outer surface greater than said predetermined distance between said first bearing surface and said second bearing surface;
   a first preselected inner unstressed diametral dimension to said inner surface;
  said at least one outer energy-absorbing member diametrally dimensionally deformed to a stressed condition by said first body member and said second body member and having a first preselected outer stressed diametral dimension less than said first preselected unstressed outer diametral dimension and a first preselected inner stressed dimension less than said first preselected inner stressed dimension less than said first preselected inner unstressed dimension, and said at least one outer energy-absorbing member having a first preselected stress and strain distribution therearound;
  at least a first inner energy-absorbing member concentrically positioned within said at least one outer energy-absorbing member for rolling motion about the common axis with said at least one outer energy-absorbing member, and said first inner energy-absorbing member comprising:
   a thin-walled, cylindrical, tubelike, annular, ductile metal member having a second preselected wall thickness and a second preselected axial length;
   an outer surface in contact with said inner surface of said at least one outer energy-absorbing member;
   an inner surface;
   a second preselected outer unstressed diametral dimension to said outer surface substantially the same as said first preselected inner unstressed diametral dimension of said at least one outer energy-absorbing member;
   a second preselected inner unstressed diametral dimension to said inner surface;
  said at least one outer energy-absorbing member diametrally deforming said first inner energy-absorbing member, for the condition of said at least one outer energy-absorbing member diametrally deformed to said first preselected outer-stressed diametral dimension and first preselected inner-stressed diametral dimension to a second preselected outer-stressed diametral dimension to said outer surface and a second preselected inner stressed diametral dimension to said inner surface less than said second preselected unstressed outer diametral dimension and second preselected unstressed inner diametral dimension, respectively; and
 said at least one outer energy-absorbing member and said at least a first inner energy-absorbing member, for the condition of said rolling motion thereof, is subjected to cyclic plastic deformation during said relative motion between said first body member and said second body member in said first preselected direction.

2. The arrangement defined in claim 1, wherein said first energy-absorbing element further comprises:
 a plurality of secondary ductile metal, thin-walled, cylindrical, tubelike, annular energy-absorbing members concentrically mounted together and in sequential surface contact;
 each of said plurality of secondary energy-absorbing members having preselected wall thicknesses thereof and preselected axial lengths;
 said plurality of secondary energy-absorbing members concentrically positioned in said first inner energy-absorbing member for diametral plastic deformation for the condition of said first inner energy-absorbing member diametrally deformed;
 a first of said plurality of secondary energy-absorbing members having an outer surface portion thereof in contact with said inner surface of said first inner energy-absorbing member;
 said plurality of secondary energy-absorbing members rolling about the common axis for the condition of said at least one outer energy-absorbing member and said first inner energy-absorbing member rolling between said first body member and said second body member; and
 said rolling motion of said plurality of secondary energy-absorbing members providing cyclic plastic bending deformation to each of said plurality of secondary energy-absorbing members for absorbing energy during said rolling motion thereof.

3. The arrangement defined in claim 1, wherein:
 the ratio of said first preselected wall thickness of said at least one outer energy-absorbing member to said unstressed diametral outer dimension thereof is less than one-tenth; and
 the ratio of said second preselected wall thickness of said first inner energy-absorbing member to said unstressed outer diametral dimension thereof is less than one-tenth.

4. The arrangement defined in claim 3, wherein:
 the ratio of said first preselected axial length of said at least one outer energy-absorbing member to said unstressed outer diametral dimension of said outer energy-absorbing member is on the order of 1.0.

5. The arrangement defined in claim 1, wherein said first axial length of said outer energy-absorbing member is less than said second axial length of said first inner energy-absorbing member, and said first energy-absorbing element further comprising:
 a plurality of other outer energy-absorbing members, substantially identical to said at least one outer energy-absorbing member, and said plurality of other energy-absorbing members concentrically mounted on said first inner energy-absorbing member in spaced apart relationship to each other and to said at least one outer energy-absorbing member; and
 means for restraining said at least one outer energy-absorbing member and said other outer energy-absorbing members in said preselected spaced array.

6. The arrangement defined in claim 2 and further comprising:
 a plurality of other energy-absorbing elements, each of said plurality of other energy-absorbing elements comprising:
  a plurality of other outer energy-absorbing members, an other inner energy-absorbing member and a plurality of other secondary absorbing members concentrically mounted substantially similarly to said concentric mounting of said at least one outer energy-absorbing member, said first inner energy-absorbing member and said plurality of secondary energy-absorbing members, and in a preselected spaced array with each other and with said first energy-absorbing element having said at least one outer energy-absorbing member, said first inner energy-absorbing member and said plurality of secondary energy-absorbing members.

7. The arrangement defined in claim 1 and further comprising:
a substantially incompressible, nondeformable cylindrical member positioned within said first inner energy-absorbing member and having a predetermined diametral dimension less than said unstressed inner diametral dimension of said inner energy-absorbing member for limiting the diametral deformation of said at least one outer energy-absorbing member and said first inner energy-absorbing member to prevent stress relieving plastic flow thereof.

8. The arrangement defined in claim 1, wherein:
said first preselected axial length of said outer energy-absorbing member is substantially identical to said second preselected axial length of said first inner energy-absorbing member, and the ratio of said first preselected axial length of said outer energy-absorbing member to said unstressed outer diametral dimension thereof is less than 1.0.

9. The arrangement defined in claim 1, wherein:
said first preselected axial length of said outer energy-absorbing member is different from said second preselected axial length of said first inner energy-absorbing member, and the ratio of said first preselected axial length of said outer energy-absorbing member to said unstressed outer diametral dimension thereof is on the order of 1.0.

10. The arrangement defined in claim 2, wherein:
said first preselected axial length of said at least one outer energy-absorbing member, said second preselected axial length of said first inner energy-absorbing member, and said preselected axial lengths of said plurality of secondary energy-absorbing members are substantially identical, and the ratio of said first preselected axial length of said at least one outer energy-absorbing member to said first preselected unstressed outer diametral dimension thereof is on the order of 1.0.

11. The arrangement defined in claim 2, wherein:
said first preselected axial length of said at least one outer energy-absorbing member is different from said second preselected axial length of said first inner energy-absorbing member, and said preselected axial lengths of each of said plurality of secondary energy-absorbing members is different from each of said first and said second preselected axial lengths, and the ratio of said first preselected axial length of said at least one outer energy-absorbing member to said first preselected unstressed outer diametral dimension thereof is on the order of 1.0.

12. The arrangement defined in claim 2, and further comprising:
a substantially incompressible nondeformable cylindrical member positioned within the smallest of said plurality of secondary energy-absorbing members and having a predetermined diametral dimension thereof less than the unstressed inner diametral dimension of said smallest of said plurality of secondary energy-absorbing members for limiting the diametral deformation of said outer energy-absorbing member, said first inner energy-absorbing member and said plurality of secondary energy-absorbing members to prevent stress relieving plastic flow thereof.

13. The arrangement defined in claim 2, wherein:
the ratio of said first preselected wall thickness of said at least one outer energy-absorbing member to said first preselected unstressed outer diametral dimension is less than 0.1;

the ratio of said second preselected wall thickness of said inner energy-absorbing member to said second preselected unstressed outer diametral dimension thereof is less than 0.1; and the ratio of wall thicknesses of each of said plurality of said secondary energy-absorbing members to the corresponding outer unstressed diametral dimensions thereof are less than 0.1.

14. The arrangement defined in claim 6, wherein:
said wall thickness of each of said plurality of other outer energy-absorbing members and said at least one outer energy-absorbing member is different from the wall thickness of adjacent other outer energy-absorbing members;

said wall thicknesses of said first inner energy-absorbing member and said plurality of other inner energy-absorbing members are different from said wall thicknesses of adjacent other inner energy-absorbing members; and said wall thickness of each of said plurality of secondary energy-absorbing members is different from said wall thickness of corresponding adjacent other secondary energy-absorbing members.

15. The arrangement defined in claim 6 and further comprising:
restraining means for restraining said plurality of other, outer energy-absorbing members, other inner energy-absorbing members and plurality of other secondary inner energy-absorbing members; and said at least one outer energy-absorbing member, said first inner energy-absorbing member and said plurality of secondary inner energy-absorbing members in said concentric mounting and said preselected spaced array.

16. The arrangement defined in claim 15, wherein:
said restraining means comprises a plurality of disc means mounted intermediate each of said energy-absorbing elements, and each of said plurality of disc means having an outer dimension less than said first preselected stressed outer dimension of said outer energy-absorbing member.

17. The arrangement defined in claim 1, wherein:
said preselected direction of movement of said second body member with respect to said first body member is linear.

18. The arrangement defined in claim 1, wherein:
said preselected direction of movement of said second body member with respect to said first body member is rotary.

19. The arrangement defined in claim 17, wherein:
said first body member comprises first flat platelike member and said first bearing surface is planar; and said second body member comprises a second flat platelike member and said second bearing surface is planar.

20. The arrangement defined in claim 17, wherein:
said first body member comprises a tubular member having an outer surface and an inner surface, and said first bearing surface comprises said inner surface thereof;

said second body member comprises a cylindrical member having an outer peripheral surface, and said second bearing surface comprises said outer peripheral surface thereof;

said energy-absorbing element cavity comprises an annular cavity between said outer peripheral surface of said second body member and said inner surface of said first body member;

said first body member is concentrically mounted on said second body member and said first body member and said second body member having a common body member axis; and said preselected direction is parallel to said common body axis.

21. The arrangement defined in claim 5 and further comprising:
a plurality of other energy-absorbing elements, each comprising:
an other inner energy-absorbing member similar to said first inner energy-absorbing member mounted in a spaced array with each other and with said first energy-absorbing element in said energy-absorbing element receiving cavity;

a plurality of other outer energy-absorbing members, each of said other outer energy-absorbing members similar to said at least one outer energy-absorbing member, and mounted on each of said plurality of other inner energy-absorbing members in said preselected spaced array; and means for restricting each of said other outer energy-absorbing members on each of said plurality of other inner energy-absorbing members in said preselected spaced array.

22. The arrangement defined in claim 21, wherein:

said first body member comprises a tubular member having an outer surface and an inner surface, and said first bearing surface comprises said inner surface thereof;

said second body member comprises a cylindrical body member having an outer peripheral surface and said second bearing surface comprises said outer peripheral surface thereof;

said energy-absorbing element cavity comprises an annular cavity intermediate said outer peripheral surface of said second body member and said inner surface of said first body member;

said first body member is concentrically mounted on said second body member and said first body member and said second body member having a common body member axis; and said preselected direction is linear and parallel to said common body axis.

23. The arrangement defined in claim 20, wherein:

said preselected direction of movement of said second body member with respect to said first body member is rotary.

* * * * *